US008762517B2

(12) United States Patent
Woundy et al.

(10) Patent No.: US 8,762,517 B2
(45) Date of Patent: Jun. 24, 2014

(54) SYSTEM AND METHOD FOR MANAGING A BROADBAND NETWORK

(75) Inventors: Richard M. Woundy, North Reading, MA (US); John Leddy, Bryn Mawr, PA (US); Richard Hertz, Collingswood, NJ (US); David I. Casti, Eugene, OR (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 693 days.

(21) Appl. No.: 12/346,162

(22) Filed: Dec. 30, 2008

(65) Prior Publication Data
US 2010/0169475 A1 Jul. 1, 2010

(51) Int. Cl.
*G06F 15/173* (2006.01)

(52) U.S. Cl.
USPC ............................................. 709/224; 726/1

(58) Field of Classification Search
None
See application file for complete search history.

(56) References Cited

U.S. PATENT DOCUMENTS

| | | | |
|---|---|---|---|
| 7,885,222 B2 * | 2/2011 | Cole | 370/328 |
| 2002/0095498 A1 * | 7/2002 | Chanda et al. | 709/225 |
| 2003/0093520 A1 * | 5/2003 | Beesley | 709/224 |
| 2004/0199634 A1 * | 10/2004 | Jackowski et al. | 709/226 |
| 2004/0199635 A1 * | 10/2004 | Ta et al. | 709/226 |
| 2005/0249214 A1 * | 11/2005 | Peng | 370/392 |
| 2006/0230444 A1 * | 10/2006 | Iloglu et al. | 726/14 |
| 2007/0033282 A1 * | 2/2007 | Mao et al. | 709/226 |
| 2007/0064617 A1 * | 3/2007 | Reves | 370/252 |
| 2007/0094725 A1 * | 4/2007 | Borders | 726/22 |
| 2007/0156822 A1 * | 7/2007 | Modaresi | 709/206 |
| 2007/0180090 A1 * | 8/2007 | Fleischman et al. | 709/223 |
| 2007/0203714 A1 * | 8/2007 | McEnroe et al. | 705/1 |

OTHER PUBLICATIONS

3GPP TS 32.299, "Telecommunication Management; Charging Management; Diameter Charging Applications," 2005.
Calhoun, P., et al., "Diameter Base Protocol," RFC 3588, 2003.
CableLabs, "Operations Support System Interface Specification CM-SP-OSSI-v3.0-I04-070803," 2007.
Cable Labs, "Edge Resource Manager Interface Specification, CM-SP-ERMI-I20-051209," 2005.
Chappell, D., "Enterprise Service Bus," 2004, pp. 1-21.
McCloghrie, K., and F. Kastenholz, "The Interfaces Group MIB," RFC 2863, 2000.
IPDR.org, "IPDR/SP Protocol Specification version 2.1," 2004.
CableLabs, "PacketCable Multimedia Specification PKT-SP-MM-I03-051221," 2005.
Zhang, R. and M. Bartell, "BGP Design and Implementation," Cisco Press, 2004, pp. 3-59.
Rigney, C., Willens, S., Rubens, A. and W. Simpson, "Remote Authentication Dial in User Service (RADIUS)," RFC 2865, 2000.
Case, J., et al., "Introduction and Applicability Statements for Internet-Standard Management Framework," RFC 3410, 2002.

(Continued)

*Primary Examiner* — Brian P Whipple
(74) *Attorney, Agent, or Firm* — Ballard Spahr LLP

(57) ABSTRACT

A process for managing usage on a broadband network, said process comprising: (a) monitoring a subscriber's broadband usage; (b) determining if said usage rises to a level indicative of an event; (c) determining if said event is consistent with heavy usage or with a security incident; (d) if said event is consistent with heavy usage, offering said subscriber at least one of a plan for an upgraded subscription, or an incentive to concentrate usage in nonpeak time; and (e) if said event is consistent with a security incident, exercising security measures to minimize unintended usage.

20 Claims, 4 Drawing Sheets

(56) References Cited

OTHER PUBLICATIONS

Symantec, "Internet Security Threat Report Trends for Jan.-Jun. 07, vol. XII," 2007.

C. Lonvick, "The BSD Syslog Protocol," RFC 3164, 2001.

Netessine, S. et al., "Introduction to the Theory and Practice of Yield Management", INFORMS Transactions on Education, vol. 3, No. 1, 2002, http://ite.informs.org/Vol3No1/NetessineShumsky. http://www.ciscopress.com/articles/article.asp?p=169556&seqNum=5&rl=1, Jan. 2004.

\* cited by examiner

SYSTEM AND METHOD FOR MANAGING A BROADBAND NETWORK

FIELD OF INVENTION

The present invention relates generally to a system and method for managing bandwidth on a broadband network, and, more specifically, to a system and method for optimizing network configuration and subscriber usage based on subscriber usage patterns.

BACKGROUND OF INVENTION

In a broadband service provider network, subscribers share a common network infrastructure, but subscribers consume network bandwidth at significantly differing rates. For example, the top 1% of subscribers may consume 15% of the total consumed network bandwidth per month, the top 5% may consume 35%, and the top 12% may consume 50%. Therefore, during peak traffic loads, a relatively small percentage of subscribers may generate network traffic that negatively impacts all subscribers served by the same network infrastructure.

One solution to this problem is to measure subscriber network consumption and curtail subscribers using exceptional traffic volume. Such an approach, however, has significant shortcomings. For example, some heavy network consumers may be willing to "pay for the privilege" of exceptional traffic volume, perhaps through a higher monthly recurring charge or through variable usage charges based on monthly consumption. Alternatively, some heavy network consumers might be willing to consume most of their bandwidth during non-peak traffic times in which their higher usage would have little impact.

While some subscribers consume bandwidth willingly, others do so unknowingly as a result of their terminal being "infected" with a virus or malware. The conventional solution for an infected terminal transmitting a large volume of emails or consuming inordinate bandwidth is to prevent the subscriber from accessing the network. Again, this solution tends to be heavy handed. This solution makes it difficult to remediate the computer or even periodically check on it to see if the problem has been rectified. This leaves the subscriber on his own to remedy the situation, typically without the use of the Internet or other online help.

Therefore, a need exists to more effectively manage bandwidth not only to provide reliable service for the subscribers at large, but also to meet the needs of the relatively few high-usage subscribers. The present invention fulfills this need among others.

SUMMARY OF INVENTION

The present invention provides a system and process that integrates existing administrative, security management and network configuration functionality of a broadband network, while monitoring subscriber usage using existing data gathering components to optimize network configuration and to moderate usage, thereby improving network performance not only for the subscribers at large, but also for the relatively few high-usage subscribers.

By way of background, applicants have identified that the network configuration, administration (e.g., billing/provisioning), and security management functions have been typically viewed as independent systems in a broadband service provider network. For example, network capacity management leverages projections of numerical subscriber growth as well as network traffic growth in order to anticipate the requirements for broadband network expansion. Individual subscribers are typically provisioned without direct coordination with network capacity projections. Additionally, when security management detects that a subscriber computer has been compromised by malware, there is minimal coordination with provisioning—except perhaps for manual processes to block outbound SMTP traffic or to take the subscriber offline. In the situations mentioned above, the network configuration tends to be managed independently.

In contrast, the present invention provides for the automated coordination of network functions such as network configuration, administrative, and security management through an architecture, referred to herein as the "Network Control System." The network control system also uses various—and preferable existing—sources of network usage information to collect data on subscriber usage. By coordinating these functions while monitoring subscriber usage, the network control system can moderate usage by charging subscribers premiums for high usage and promoting off peak service. The network control system can also signal the network and/or related administrative systems, such as billing/provisioning, to modify the network's configuration, to enable accounting for exceptional subscriber network usage, or to modify the subscriber's network usage for security and/or overall network performance.

The present invention provides for a number of innovative broadband services that leverage the analysis and processing capabilities of the network control system. For example, high-usage subscribers may receive offers for short-term upgrades in network speed, dependent on their recent usage patterns and on the current available capacity of the broadband access network. To this end, the network control system may also allocate additional network capacity (e.g. new DOCSIS service flows or additional QAMs) for "premium" subscribers with heavy network traffic.

Furthermore, some subscribers may receive incentives to concentrate most of their network consumption during non-peak traffic times. The service provider is motivated to provide incentives to this group of subscribers because their non-peak time network consumption minimizes the incremental capital spending on network infrastructure. The capital spending tends to be driven by the capacity required for peak time network consumption.

Additionally, the network control system may recognize that a subscriber suffers from an infected computer participating as a "zombie" in a "botnet" by detecting abnormal network traffic via Intrusion Detection Systems. In response, the network control system may re-provision the subscriber's broadband access into a "quarantine" state, which enables (perhaps limited) subscriber Internet access while the computer security issue is remedied.

Accordingly, one aspect of the present invention is a process for optimizing network configuration and moderating usage on a broadband network by integrating network configuration, administrative and security functions while monitoring usage. In one embodiment, the process comprises: (a) monitoring a subscriber's broadband usage; (b) determining if the usage rises to a noteworthy level indicative of an event; (c) determining if the event is consistent with heavy usage or with a security incident; (d) if the event is consistent with heavy usage, offering the subscriber at least one of a plan for an upgraded subscription, or an incentive to concentrate usage in nonpeak time; and (e) if the event is consistent with a security incident, exercising security measures to minimize unintended usage.

Another aspect of the present invention is a network control system for optimizing network configuration and moderating usage on a broadband network by integrating the network configuration, administrative, and security management functions. In one embodiment, the network control system comprises: (a) a monitoring component configured for capturing network usage data and analyzing the data to identify events and trends; (b) a controller component configured for receiving an event generated from the monitoring component, processing the event according to the trends, business rules and subscriber information, and generating a response; and (c) a communication component configured to facilitate inter-component communication including reacting to the response by signaling a network configuration system, an administrative system, or a security system, to effect at least one of offering the subscriber an upgraded subscription, offering the subscriber an incentive to concentrate usage in nonpeak time, or exercising security measures to minimize unintended usage of the subscriber.

Yet another aspect of the invention is a network comprising the network control system described above.

DETAILED DESCRIPTION

Figure 1:
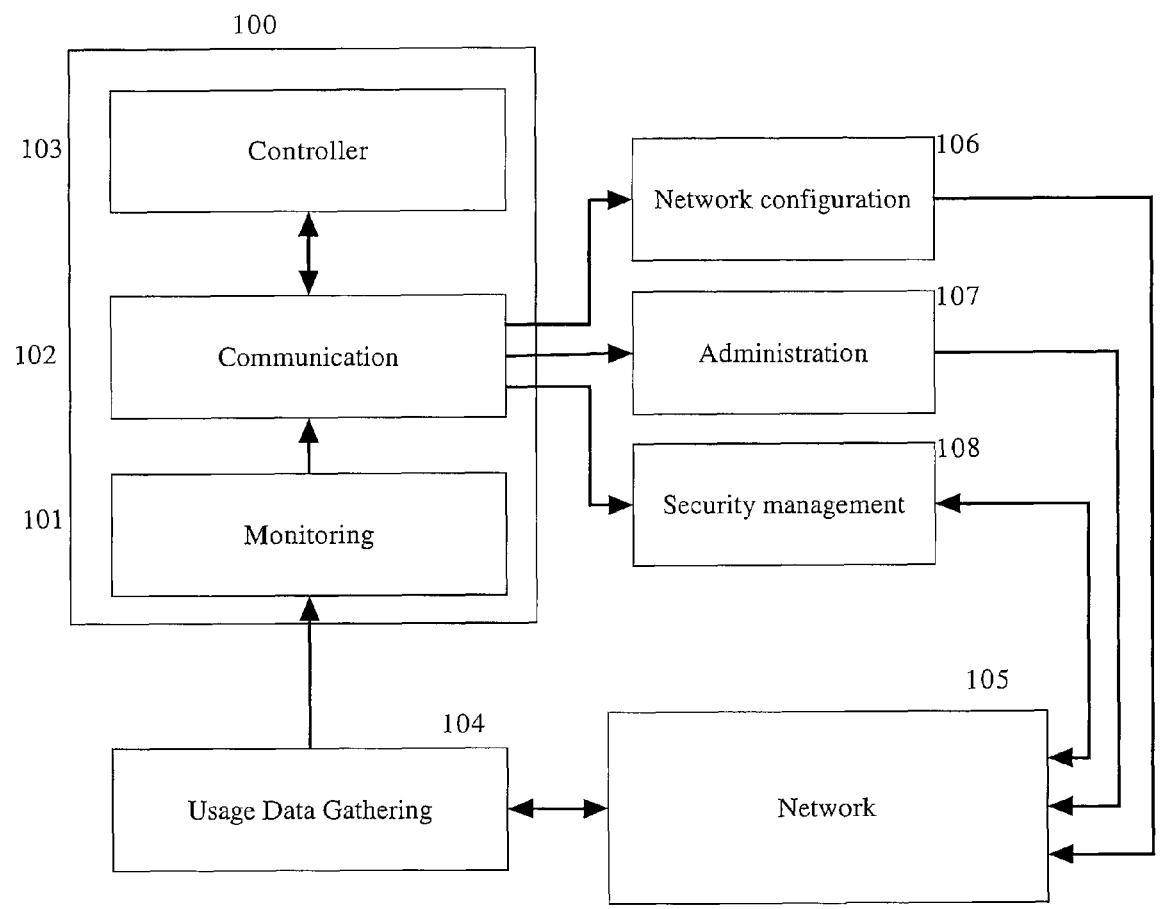
FIG. 1 is a system diagram of one embodiment of the present invention.

Referring to FIG. 1, an embodiment of a control system 100 of the present invention is shown. The system 100 comprises a monitoring component 101, a communication component 102, and a controller component 103. Specifically, the monitoring component interfaces with at least one usage data gathering system 104 associated with the network 105. The monitoring component is configured to receive and analyze data from the data gathering system 104 to determine if the data is consistent with an event of high usage and, if so, to transmit an event signal to the controller component 103 via the communication component 102. The controller component is configured to receive the event signal and determine if such an event indicates a need to initiate at least one of the following responses: modify the subscriber's bandwidth, offer the subscriber an upgraded service plan, incentivize the subscriber to concentrate usage in nonpeak times, or determine if the subscriber's terminal is infected. To this end, the controller component interfaces with a network configuration system 106, an administrative system 107 and a security management system 108 via the communication component 102. The network configuration component 106 is configured to modify the network to increase or decrease available bandwidth to a subscriber in response to a signal from the controller component 103 via the communication component 102. The administrative system 107 is configured to offer the subscriber associated with the event incentives to change subscription plans for increased bandwidth or to concentrate use to non-peak times in response to a signal from the controller component 103. The security management system 108 is configured to execute protective measures in response to a signal from the controller component 103. This protective measures may involve, for example, quarantining the subscriber from the network, restricting usage, and/or heightened monitoring of usage.

The different embodiments and the components of the system 100 are discussed in detail below with respect to the schematic of FIG. 1. It should be understood, however, that this schematic is provided for illustrative purposes only, and the system and process of the present invention may be practiced in ways not specifically shown in FIG. 1. For example, although certain components and systems are depicted as single entities, this is done for illustrative purposes only. Their functionality may be distributed among multiple components or consolidated in just one. For example, the monitoring component may be integrated with the controller component, likewise the controller component may be distributed among different computers/components. Furthermore, the various components and systems described herein may comprise any known or later-developed discrete or networked computer(s) having one or more processors, memory, and an input/output functionality, and being particularly configured to execute the function(s) for which it is intended to perform. Additionally, it should be understood that the various components shown in FIG. 1 are not necessarily housed in a common area or even operated by a common entity—i.e., the various components may be operated by different companies and interfaced together. Therefore, the schematic of system 100 should not be used to limit the structure of the system more narrowly than the claims.

Figure 2:
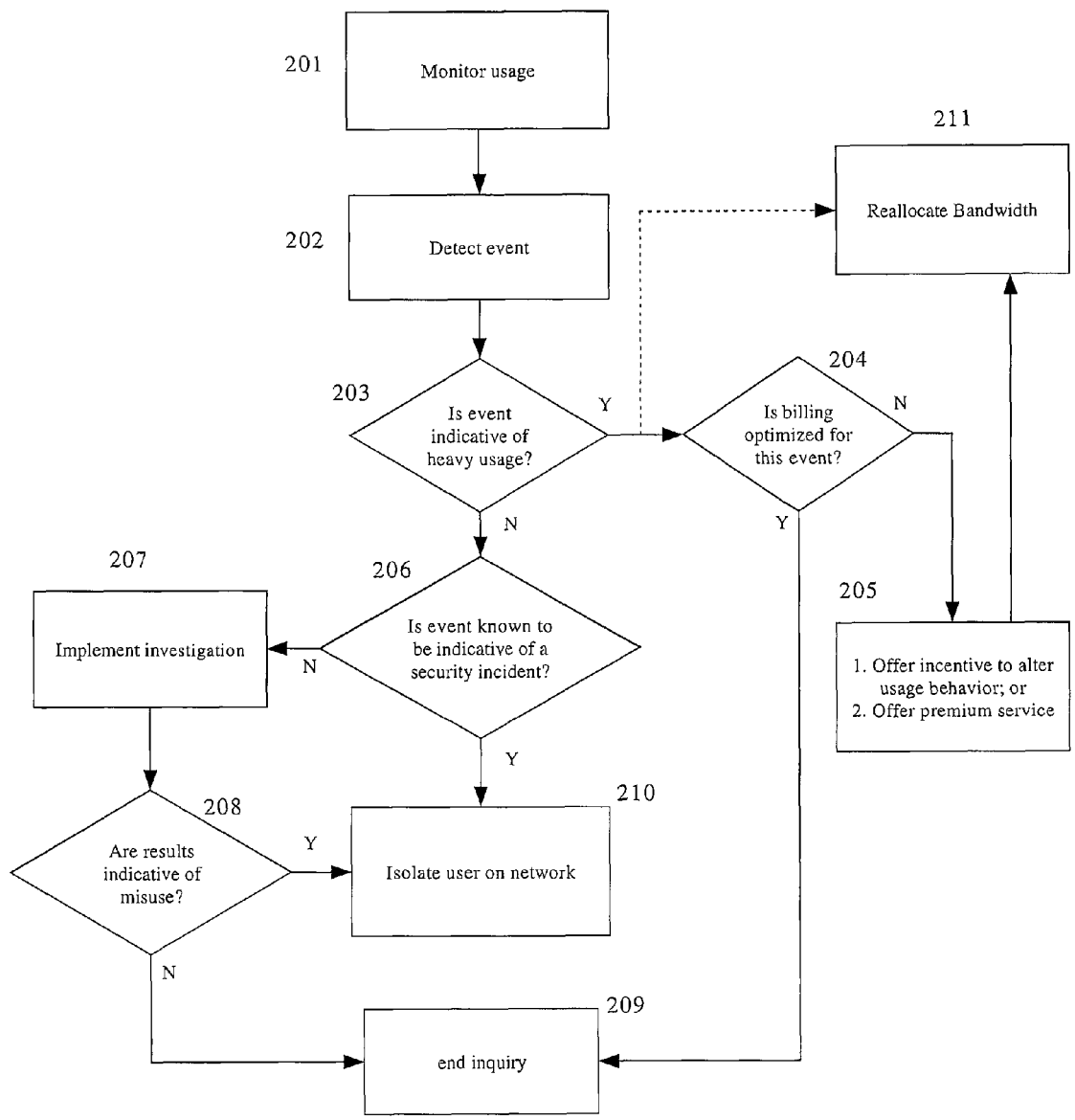
FIG. 2 is a flow chart illustrating one embodiment of the present invention.

The operation of the network control system 100 is described with reference to the flow chart 200 disclosed in FIG. 2. In step 201, subscriber usage is monitored using, for example, the data gathering system 104 mentioned with respect to FIG. 1. In step 202, a determination is made by the monitoring component 101 that the usage is indicative of an event such as an inordinate amount of downloading, uploading, or email transmission activity. If an event is detected, a signal is transmitted to the controller component 103 in step 203, which determines if the event is consistent with typical heavy subscriber network usage. To this end, in one embodiment, the monitoring component detects unusual activity across a plurality of subscribers, and then the process proceeds to the controller component in which a determination is made whether a single subscriber's activity is unusual. If the activity of a subscriber is determined to be unusual, the process proceeds to step 204, in which a determination is made whether the subscriber service plan is optimized to its usage. If so, the inquiry ends in step 209. If the service plan is not optimized, then the process proceeds to step 205 in which the controller component 103 interfaces with the administrative system 107 (via the communication component 102) to offer the subscriber an enhanced subscription plan for higher usage, or an incentive to concentrate usage during off-peak times. Depending on whether the offer is accepted, the controller component 103 may instruct the network configuration system 106 to curtail or expand the subscriber's bandwidth or access to the network in step 211. Alternatively, the controller component may determine that an optimized service plan is not available (e.g., the network lacks the necessary capacity), and proceed directly to step 211.

Returning to step 203, if the event is not consistent with normal high usage or historical usage, security measures are implemented. The implementation of the security measures can vary. In the embodiment depicted in flow chart 200, the process proceeds to step 206, in which a determination is made by the controller component 103 whether the usage is indicative of a problem such as a virus. If so, the process proceeds to step 210 in which the controller component signals the security management system 108 via the communication component 102 to quarantine the subscriber in step 210. This quarantine may involve, for example, limiting bandwidth (or otherwise limiting access to the internet), or it may involve isolating the subscriber completely. If the usage is determined not to be indicative of misuse in step 206, the process proceeds to step 207 in which an investigation into the anomaly is conducted. This investigation may include, for example, automated network protocol analysis using a security management system 108, or a telephone call to the subscriber. If the results of this investigation indicate that the event is indicative of misuse the process proceeds to step 210, as described above. If, however, the investigation results show no impropriety the inquiry is terminated in step 209.

Figure 3:
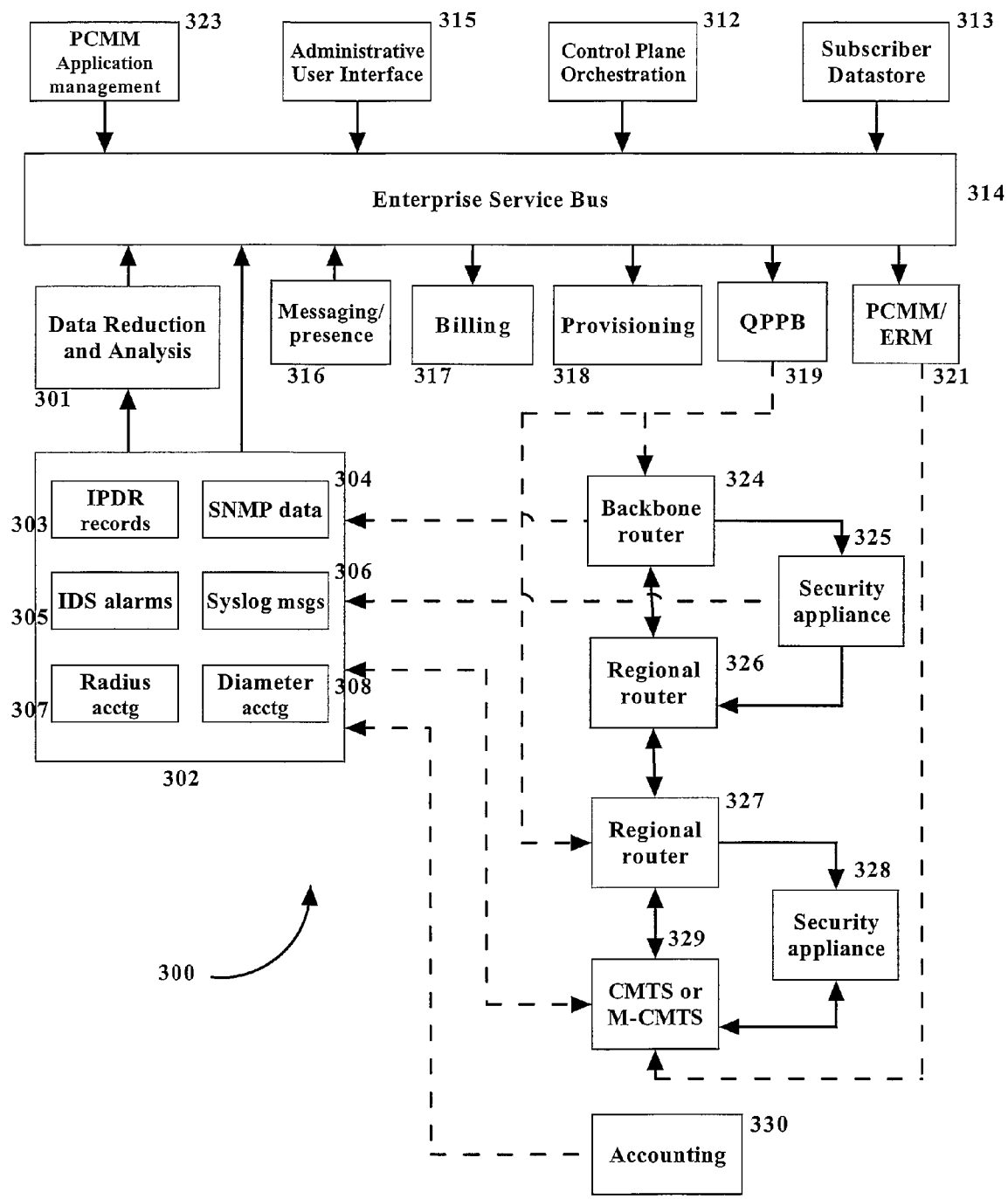
FIG. 3 is a conceptual diagram of the network control system integrated with a broadband network.
Figure 4:
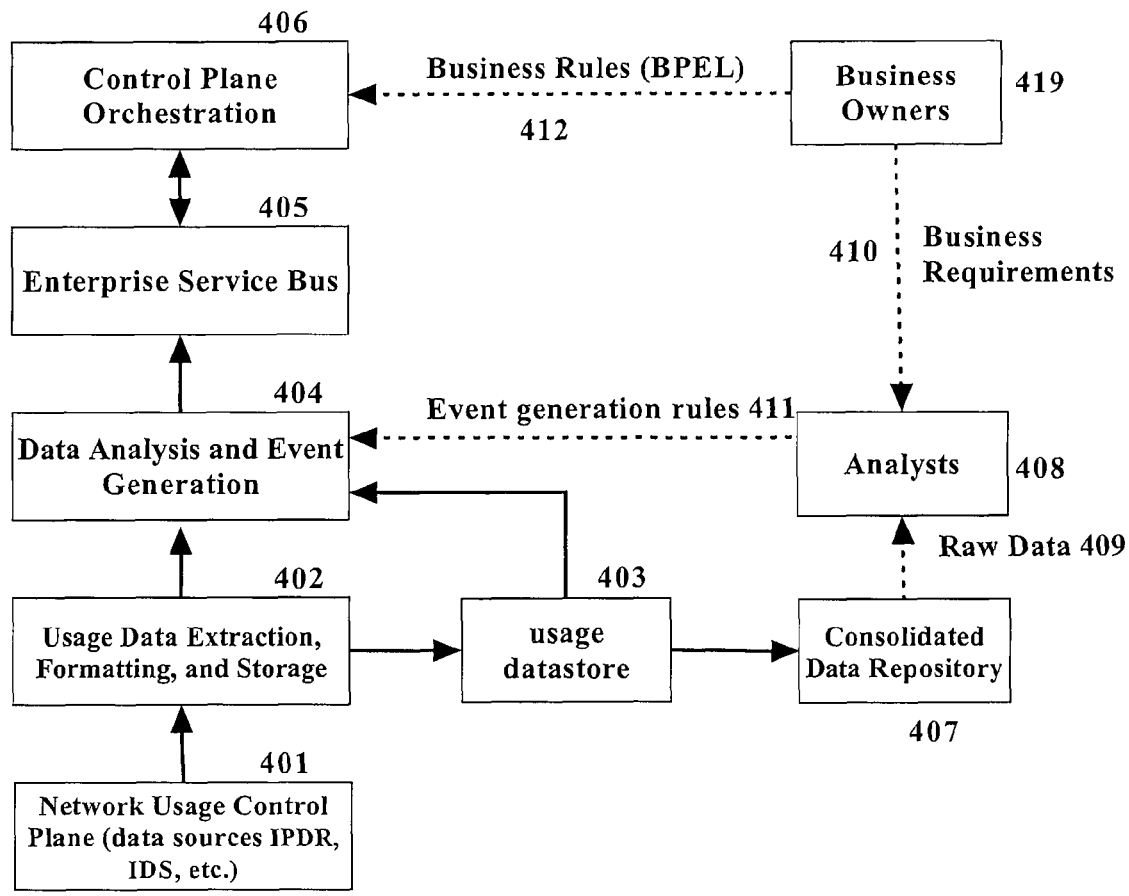
FIG. 4 is a schematic of one example of Data Analysis and Event Generation within the network control system.

Referring now to FIGS. 3-5, the present invention is described in terms of a cable-based broadband service provider network. It should be understood, however, that the present invention is not limited to a cable-based networks and can be practiced with fiber-optic, telephony (e.g. DSL), or other broadband networks. In referring to this embodiment, the following acronyms are used to describe the system components and methods:

| | |
|---|---|
| 3GPP | Third Generation Partnership Project |
| API | Application Programming Interface |
| BGP | Border Gateway Protocol |
| BPEL | Business Process Execution Language |
| BPM | Business Process Management |
| CDR | Call Detail Record |
| CMTS | Cable Modem Termination System |
| CPE | Customer Premises Equipment |
| DB | Database |
| DHCP | Dynamic Host Configuration Protocol |
| DOCSIS | Data over Cable Service Interface Specifications |
| DSL | Digital Subscriber Line |
| ERM | Edge Resource Manager |
| ERMI | Edge Resource Manager Interface |
| ESB | Enterprise Service Bus |
| HFC | Hybrid Fiber Coax |
| IDS | Intrusion Detection System |
| IETF | Internet Engineering Task Force |
| IMS | IP Multimedia Subsystem |
| IP | Internet Protocol |
| IPDR | Internet Protocol Detail Record |
| JCA | Java Connection Architecture |
| M-CMTS | Modular Cable Modem Termination System |
| MIB | Management Information Base |
| MOM | Message-Oriented Middleware |
| MPEG | Moving Pictures Expert Group |
| OSS | Operation Support System |
| PCMM | PacketCable Multimedia |
| QAM | Quadrature Amplitude Modulation |
| QoS | Quality of Service |
| QPPB | QoS Policy Propagation on BGP |
| RADIUS | Remote Authentication Dial-In Subscriber Service |
| SAMIS | Security Assistance Management Information System |
| SMTP | Simple Mail Transfer Protocol |
| SNMP | Simple Network Management Protocol |
| TCP | Transmission Control Protocol |
| UDP | Subscriber Datagram Protocol |
| VoIP | Voice over Internet Protocol |
| XML | Extensible Markup Language |

These are well know acronyms and terms and should be construed in accordance with their ordinary meaning.

Referring to FIG. 3, one embodiment of the network control system is shown integrated into a broadband network 300. The core components in the network control system process, analyze, and act on sources of information about network usage. The system comprises a monitoring component, which, in this embodiment, is a Data Reduction and Analysis component 301. It accepts network usage information from the data sources 302, normalizes the network usage information as appropriate (e.g. bandwidth consumption may be obtained from various data sources 302 such as IPDR 303 or SNMP 304, messaging volume from Radius 307 or Diameter 308, and malicious activities may be reported by IDS devices 305 or Syslog 306), captures the network usage information in storage, and analyzes the network usage information for immediate network events, as well as short-term and long-term trends. One exemplary immediate event may be that a broadband subscriber device is attempting to attack a critical network server. On the other hand, an exemplary long-term trend may be an estimate of time duration of the "peak traffic" period for a particular broadband access network.

The following is a partial list of potential sources of information about network usage:

IPDR 303, or IP Detail Records, which are defined by IPDR.org and implemented by many vendors. (See, e.g., IPDR.org, "IPDR/SP Protocol Specification Version 2.1", 2004.) IP Detail Records provide information about IP-based service usage. In the cable broadband environment, DOCSIS® CMTSs generate IPDRs that may report information at the granularity of individual broadband subscribers. (See, e.g., CableLabs, "Operations Support System Interface Specification CM-SP-OSSIv3.0-I07-080522", 2008.)

SNMP 304, or Simple Network Management Protocol, is an IETF standard for monitoring network devices over an IP network, as well as enabling network devices to generate alert messages to network management systems. (See, e.g., Case, J., Mundy, R., Partain, D., and B. Stewart, "Introduction and Applicability Statements for Internet-Standard Management Framework", RFC 3410, 2002.) Routers, servers, and other network nodes usually support SNMP-based network management, both for the polling of bandwidth usage as well as the generation of alerts for unusual conditions and subscriber activities.

Information from security appliances such as Intrusion Detection Systems (IDS) 305; this information tends to be vendor-specific. Security appliances 325 and 328 intercept and analyze network traffic for security threats and/or potential network issues, and detect Internet attacks and malicious activities.

Syslog 306, an IETF standard for transmitting logging messages across an IP network (although the payload of Syslog messages tends to be vendor-specific). (See, e.g., C. Lonvick, "The BSD Syslog Protocol", RFC 3164, 2001, and R. Gerhards, "The Syslog Protocol", RFC 5424, 2008.) Routers, servers, and other network nodes usually support the generation of Syslog messages for a wide variety of anomalous conditions, including malicious or unusual subscriber network activity observed by the Syslog message source.

RADIUS 307 and DIAMETER 308, IETF standards to enable authentication, authorization, and accounting over an IP network. (See, e.g., Rigney, C., Willens, S., Rubens, A. and W. Simpson, "Remote Authentication Dial In User Service (RADIUS)", RFC 2865, 2000, and Calhoun, P., Louglmey, J., Guttman, E., Zorn, G. and J. Arkko, "Diameter Base Protocol", RFC 3588, 2003.) RADIUS is the earlier IETF standard, and is often used in dial-up and DSL networks. RADIUS accounting messages report on the volume of traffic for a single subscriber session. In some cases, RADIUS accounting messages are transmitted as Call Detail Records (CDRs) in Voice over IP (VoIP) applications. DIAMETER is the planned IETF replacement for RADIUS, and is the protocol basis of many authentication and accounting messages 330 defined in the 3GPP/IMS standards [See, e.g., 3GPP TS 32.299, "Teleconmmunication management; Charging management; Diameter charging applications"].

Both immediate events and short-term and long-term trends are reported to the controller component, which, in this embodiment, is a Control System Orchestration component 312. The Control System Orchestration component 312 processes the events received from the Data Reduction and Analysis component 301 according to configured business rules and subscriber information. In a Service Oriented Architecture, the Control System Orchestration component 312 may be realized as an orchestration server or a BPM (Business Process Management) server. The Control System Orchestration may obtain subscriber information from the Subscriber Datastore component 313, including the association of cable modems to subscribers, the subscriber email address and instant messaging identity, and the broadband services purchased by the subscriber.

The business rules may direct the Control System Orchestration to do any one or more of the following: to ignore the incoming event; to notify the subscriber of unusual network usage; to change the subscriber's provisioned bandwidth; to bill the subscriber based on incremental network consumption; or to modify the network to provide additional capacity.

It may be useful in some circumstances (e.g. critical network security breach) for events to bypass the Data Reduction and Analysis component, and to be processed immediately by the Control System Orchestration component.

Communication among the components of the network control system 100 and the other components of the network is facilitated by the communication component, which, in the embodiment of FIG. 3, is the Enterprise Service Bus (ESB) component 314. (See, e.g., Chappell, D., "Enterprise Service Bus", 2004.) It links many of the components of the network control system 100 using XML messaging using, for example, message-oriented middleware (MOM), which is also common in a Service Oriented Architecture. New components can be easily added to the Enterprise Service Bus using web services APIs or the Java Connector Architecture (JCA). Messages can be multicast to multiple components on the ESB. For example, an Administrative Subscriber Interface 315 may track and display all inbound events from the Data Reduction and Analysis component 301, as well as all actions taken by the network control system Orchestration component 312, if that feature is desired.

The PCMM Application Management component 323 may be used by an end-user or a network management system to request QoS-based services from the PCMM Policy Server component 321. (See, e.g., CableLabs, "PacketCable Multimedia Specification PKT-SP-MM-I04-080522", 2008.) The QoS-based service request may flow from the PCMM Application Management component 323 to the PCMM Policy Server component 321 through the Enterprise Service Bus component 314. This enables the network control system 100, particularly the Control System Orchestration component 312, to have visibility into subscriber requests for QoS-based services, and perhaps to allow or disallow said requests based on the current usage of the subscriber and on any current security incidents.

The network control system 100 may use various components (as well as others) via the ESB 314 to act on the business rules configured in the Control System Orchestration component 312. For example, a Messaging/Presence component 316 may be used to inform the subscriber of unusual network usage activity and any subsequent account modification, via email, instant messaging, voicemail, etc. The presence functionality may be used to determine whether a subscriber is currently online or available by phone, so that a customer care agent may contact the subscriber in person.

A Billing component 317 may be used in a variety of ways, such as to upgrade the subscriber account to a higher bandwidth consumption tier, to post charges for exceeding a monthly consumption limit, or to suspend or close a subscriber account (e.g. because of intentionally malicious subscriber network behavior).

A Provisioning component 318 may be used in a variety of ways, such as to re-provision network service to a different bandwidth tier or to block outbound SMTP traffic (e.g. via the DOCSIS configuration file).

A QoS Policy Propagation via BGP (QPPB) component 319 may be used to signal routers 324, 326, 327, and 329 about special handling of subscriber traffic. For example, QPPB component 319 may be used for router-based rate limiting of subscriber traffic targeted to a known infected computer, and for the redirection of subscriber network traffic to a security appliance to screen out inbound "botnet" command and control traffic.

A PCMM (PacketCable™ MultiMedia) Policy Server component 321 may be used to signal an edge router 329 (e.g. a DOCSIS CMTS) to create a subscriber service flow with specific bandwidth management characteristics. (See, e.g., CableLabs, "PacketCable Multimedia Specification PKT-SP-MM-I04-080522", 2008.) The service flow may be configured to impact all subscriber traffic, or only a portion of subscriber traffic (based on, for example, IP addresses and TCP/UDP ports).

An ERM (Edge Resource Manager) component 321 (shown integrated with the PCMM component) may be used for the management of downstream QAM channels on a Universal Edge QAM device, as part of a Modular CMTS architecture. (See, e.g., CableLabs, "Edge Resource Manager Interface Specification, CM-SP-ERMI-I03-081107", 2008.) The Universal Edge QAM device enables the delivery of DOCSIS data and MPEG video over the cable Hybrid Fiber Coax (HFC) network. With respect to the network control system, the ERM may be used to enable the allocation of additional DOCSIS QAM channels in the HFC network in the presence of heavy Internet traffic.

It should be appreciated that the functionality of the network configuration system 106, administration system 107 and security system 108 disclosed in FIG. 1, are distributed over the systems mentioned above.

The interaction of the network control system with network elements in a cable broadband network 300 is now considered. DOCSIS CMTS 329 supplies JPDR records 303 to the data sources 302, enabling SNMP 304 to collect bandwidth and subscriber network usage information for the network control system. The security appliances 328, 325 capture unusual subscriber network usage information (e.g. participation as a "zombie" in a "botnet"), as another potential source of data for the network control system 300. These various sources of data are processed by the Data Reduction and Analysis component 301, which generates a notice of network usage events transmitted over the Enterprise Service Bus component 314 for the Control System Orchestration component 312. The Control System Orchestration component 312 applies business rules to the notice of network usage events; and leverages the QPPB 319, PCMM Policy Server and ERM components 321 to affect the subscriber network experience.

In the context of security management, QPPB 319 may be used for router-based traffic shaping, and for the redirection of inbound subscriber traffic from a backbone router 324 or regional router 327 to a security appliance 325 or 328, respectively, for malware mitigation, instead of forwarding that traffic to the next router 326 or 329, respectively.

PCMM component 321 may be used to increase or decrease the effective DOCSIS network bandwidth for the subscriber (without the reset of the DOCSIS cable modem), or change the traffic priority. The ERM may be used to allocate additional DOCSIS QAM channels as required for optimal network performance.

As mentioned above, the network control system of the present invention facilitates a number of functions including, for example, (1) dynamic bandwidth reallocation, (2) service plan optimization, (3) optimization of subscriber usage, and (4) enhanced security 1. Bandwidth Reallocation There are at least two significant considerations in the dynamic allocation of additional DOCSIS QAM channels. First, the broadband service provider needs to supply a pool of 'spare' QAM channels from which to allocate. This is likely to be a serious business challenge, since there are many alternative uses for QAM channels such as broadcast linear video (analog and digital), narrowcast video (e.g. video on demand and switched digital), and potentially video multiplexes for targeted advertising. The competition for QAM channels may be simplified in the future as broadcast linear video and targeted advertising video streams eventually transition to unicast switched digital video streams; at least this narrows the QAM channel conflict between DOCSIS and narrowcast video.

The other consideration is in the largely "passive" role of the Edge Resource Manager (ERM) in the Modular CMTS (M-CMTS) architecture, according to the interfaces defined in CableLabs, "Edge Resource Manager Interface Specification, CM-SP-ERMI-I03-081107", 2008. The Edge QAMs register their resources with the ERM, and the M-CMTS core initiates the resource transactions with the ERM to request or release a QAM channel. The ERM can detect an Edge QAM failure, and the ERM responds to M-CMTS resource requests with Edge QAM channel resources (possibly leveraging operator-dependent policies in the selection process). Therefore, with the current M-CMTS architecture, it appears that the M-CMTS core may actively participate in the DOCSIS QAM channel augmentation process. Alternatively, new ERMI messages might be defined to signal the availability of additional DOCSIS QAM channel resources to the M-CMTS core since the last M-CMTS core resource request.

2. Service Plan Optimization

Rather than or in addition to reallocating bandwidth, it may be beneficial to modify usage to optimize system performance by offering optimized plans. Some "premium" broadband subscribers, such as commercial organizations or certain residential subscribers, may express interest in receiving offers for short-term upgrades of additional network bandwidth. An offer may include the proposed bandwidth augmentation and pricing, and may be communicated through instant messaging or email (via the Messaging/Presence component 316 of the network control system). If these premium subscribers accept the offer, the broadband access network is re-provisioned (dynamically via PCMM 321) for higher network bandwidth for a period of time, and the subscriber is billed according to the terms of the offer. Otherwise, the offer can be ignored or rejected with no penalty, although this may be interpreted as a lack of interest for the particular offer. The customer may have access to past offers that were accepted or rejected, as well as the ability to view any incremental charges.

In one embodiment, the Control System Orchestration component 312 is responsible for determining whether any bandwidth augmentation offers are made, and if so, which subset of premium subscribers may receive offers at this time (depending on the amount of available broadband access capacity).

In order to make effective offers of bandwidth augmentation, the network control system should consider several factors. First, it should consider the amount of available capacity in the broadband access network. The broadband service provider may want to avoid making such offers if the broadband access network is currently congested. Second, it should consider the amount of recent network traffic generated by the premium subscriber. If the subscriber has been generating network traffic close to the maximum bandwidth limit, then the subscriber is much more likely to benefit from bandwidth augmentation. Third, it should anticipate interest in the offer by the premium subscriber. The subscriber may explicitly communicate interest to the broadband service provider, or interest may be inferred by the subscriber's reaction to past broadband augmentation offers.

The network control system may rely on the following data sources to support this service:

- SNMP-based collection of counters 304 associated with the Interfaces Group MIB from CMTS DOCSIS interfaces, to determine the currently available capacity of the broadband access network. (See, e.g., McCloghrie, K., and F. Kastenholz, "The Interfaces Group MIB", RFC 2863, 2000.)
- IPDR-based collection of SAMIS records 303 with per-service flow statistics [DOCSIS-OSS], to determine the recent network traffic profile of the premium subscriber.

The Data Reduction and Analysis component 301 may generate events to the Control System Orchestration component 312 based on sustained bandwidth usage by premium subscribers, as well as events based on significant changes to the available capacity of the broadband access network (e.g. a transition from uncongested to congested network, or vice versa).

3. Incentives for Non-Peak Time Usage

A subset of potential broadband subscribers, such as value-conscious consumers with time flexibility, may receive incentives from the broadband service provider (e.g. a reduced price and/or additional packaged services) to choose a broadband access service in which they consume most of their traffic volume during non-peak traffic times. During non-peak traffic times, the "incentive subscribers" may enjoy the "flagship" bandwidth rate, but the subscriber bandwidth may be restricted during peak traffic times. Notice that this is envisioned to be a voluntary service (hence the need for subscriber incentives); depending on the lower bandwidth during peak traffic times, this service may or may not be appropriate for best effort VoIP services. The incentive subscriber may be notified about bandwidth changes for non-peak-to-peak transitions (if desired), and the subscriber may be offered an upgrade to a premium subscriber service if the bandwidth usage during peak traffic times is consistently at the bandwidth maximum.

This subscriber service is reminiscent of a service industry concept known as "yield management". This term is used to describe techniques for the allocation of limited resources among a variety of customers, in a manner that optimizes the total revenue or "yield." For example, the travel industry uses yield management in the allocation of airplane seats and hotel rooms to business travelers and leisure travels. Other examples of yield management include time of use electric metering, and mobile phone calling plans with night and weekend rates.

In the case of broadband access networks, there is often significant and consistent variation in aggregate network traffic based on the time of day. With respect to a representative CMTS, approximately 50% of the CMTS downstream capacity may be consumed at peak (e.g. 8 pm local time), but at least 70% of CMTS downstream capacity may be available at non-peak traffic times (e.g. 4 am local time). Network infrastructure expansion is typically driven by congestion during peak traffic periods, so additional subscriber traffic during non-peak traffic periods is efficient for the broadband service provider with respect to capital spending.

The network control system may rely on the following data sources to support this service:

SNMP-based collection of counters 304 associated with the Interfaces Group MIB from CMTS DOCSIS interfaces, to determine the transitions from non-peak to peak traffic periods for the broadband access network; and IPDR-based collection of SAMIS records 303 with per-service flow statistics [DOCSIS-OSS], to determine the network traffic profile of the incentive subscriber during peak traffic periods.

The Data Reduction and Analysis component 301 may generate events to the Orchestration component 312 based on sustained bandwidth usage by incentive subscribers during peak traffic time periods, as well as events based on significant aggregate network traffic changes in the broadband access network (e.g. a transition from peak traffic to non-peak traffic, or vice versa).

The Orchestration component 312 may be responsible for determining when to transition incentive subscribers from non-peak to peak bandwidth rates, and vice versa. The Orchestration component may also determine whether to send flagship upgrade offers to incentive subscribers who may benefit from the flagship bandwidth rate during peak traffic periods.

4. Quarantine Service for Subscribers with Security Issues

The "quarantine service" is designed for the broadband subscriber with security issues caused by involuntary means, such as a subscriber with an infected computer participating as a "zombie" in a "botnet." While no subscriber may "volunteer" to have a computer infected with malware, it may be a fairly commonplace occurrence; some security experts suggest that between 10% and 25% of all broadband subscriber computers are infected with malware or a virus. Symantec estimates that 10% of all "spam zombies" in the world are located in the United States. (See, e.g., Symantec, "Internet Security Threat Report Trends for January-June 7, Volume XII", 2007.) The goal of this service is to enable (perhaps limited) subscriber Internet access while the computer security issue is remedied.

The network control system may detect subscriber computer infections automatically, through information from the broadband service provider's own Intrusion Detection Systems (IDS), information obtained from security appliances 325 and 328, or through the analysis of "signature" network patterns (such as unusual coordinated traffic patterns by groups of computers organized in a single "botnet"). The network control system may also be manually notified of computer infections reported by external entities such as law enforcement agencies.

Regardless of the means of detection, the subscriber is notified of the computer infection through instant messaging, email, and/or other communication mechanisms (via the Messaging/Presence component 316 of the network control system), so that the subscriber has visibility and understanding of the security threat, and has the information needed to remediate or restore the computer. QPPB 319 may be used for the redirection of inbound subscriber traffic to a security appliance (similar to the operation of an IDS) for malware network mitigation; QPPB 319 may also be used for router-based traffic shaping, in order to control the aggregate amount of traffic directed to the security appliance. Provisioning of a new DOCSIS configuration file may be used to redirect outbound subscriber traffic to a security appliance, to restrict upstream traffic directed to the security appliance, and/or to block outbound SMTP traffic (for a "spam zombie" infection).

The network control system may rely on the following data sources to support this service:

IPDR-based collection of SAMIS records 303 with per-service flow statistics [DOCSIS-OSS], as a possible mechanism to detect unusual coordinated traffic patterns associated with a "botnet."

IPDR-based collection of CPE records 303 [DOCSIS-OSS], to track the current IP addresses of infected subscriber computers (which may change due to DHCP protocol operation). The CPE IP addresses are needed to ensure that QPPB 319 is applied only to traffic associated with infected computers.

Collection of information from security appliances to determine the status of infected computers.

The Control System Orchestration component 312 may be responsible for identifying infected computers and applying appropriate mitigation measures (e.g. redirection of subscriber traffic to a security appliance, and/or blocking of outbound SMTP traffic), as well as restoring subscriber service after a computer infection has been remedied.

An important step in the network control system is the data analysis and event generation. As described above, a core component of the network control system 300 is the Data Reduction and Analysis component 301, which may detect significant network usage events for processing by the Control System Orchestration component 312. However, the Data Reduction and Analysis component 301 should avoid overwhelming the Control System Orchestration component 312 or Enterprise Service Bus 314 with unnecessary messages. Therefore, a key concept for the network control system 300 is to distinguish the rules for determining a network usage event, from the rules for processing and reacting to a network usage event.

Referring to FIG. 4, the interaction of the rules for determining events and responding to those events is considered. The rules for the determining a usage event by the Data Reduction and Analysis component 301 are based on engineering/IT constraints. Specifically, data analysts 408 review the raw network usage data 409 from a data repository 407 and the baseline business requirements 410, and use these inputs to build event generation rules 411 for Data Reduction and Analysis in step 404. Ideally, these rules limit the maximum number of a notice of network usage events to the capacity of the Enterprise Service Bus and Control System Orchestration components. The baseline business requirements 410 help the data analysts 408 ensure that all "potentially interesting" network usage events are generated, although some such events will be subsequently ignored by the Control System Orchestration component 312.

The benefit is that the Control System Orchestration business rules 412 by the business owners 419 may be changed independently of the network usage event rules by the analysts 408. For example, the baseline business requirement 410 may require the generation of an event for each premium subscriber reaching a certain network consumption threshold in a week, in order to identify potential candidates for offers to upgrade their network bandwidth. The Control System Orchestration component 312 may implement business rules 412 that process these events, and determine the feasibility and prioritization of such offers in particular portions of the broadband access network.

Another key difference between the event generation rules for Data Reduction and Analysis, and the business rules for Control System Orchestration, is that the event generation rules 411 are preferably, although not necessarily, programmed as state-of-the-art software (e.g. Java or C++), whereas the business rules 412 are likely, although not necessarily, to be configured as Business Process Execution Language (BPEL) logic using off-the-shelf graphical tools. This enables less-technical business owners 419 to build and understand their own Control System Orchestration business rules 412.

The diagram of FIG. 4 shows one possible instantiation of the core components of the network control system architecture. Specifically, in step 401, the network usage control system data sources (e.g., IPDR 303, IDS 305, etc.) transmit data to the network control system 300. In step 402, data extraction occurs, using a data extraction/formatting/storage software 403, for example, "VIVID" developed for Comcast. VIVID is a real-time, high-volume, general data collection and management system, with data analysis and archival storage 407 capabilities. The data extraction/formatting/storage software 403 feeds the Data Analysis and Event Generation component in step 404, which uses data analyst-developed event generation rules 411 to generate network usage events described previously.

Once an event is generated in step 404, an event signal is transmitted using the enterprise service bus function in step 405 for control system orchestration in step 406. In this step, the Control System Orchestration component uses the business rules 412 to determine a response to the event.

By implementing the network control system 300 in network 105, the network configuration is optimized while subscribers' usage is moderated, thereby decreasing latency in the network and reducing the frequency for costly increases in network capacity.

What is claimed is:

1. A process comprising:
    monitoring data about a user's usage of a network;
    determining from the monitored data that the user's network usage has exceeded a level indicative of an event using a control system that comprises one or more computing devices;
    determining, by the control system, whether the event is a security incident by comparing the user's network usage to one or more of a usage of other users and a historical usage of the user, wherein determining whether the event is a security incident comprises determining whether the user's network usage is consistent with a normal network usage, and wherein an abnormal network usage indicates the event is a security incident;
    if the event is not determined to be a security incident, the control system sending the user an offer to change usage plans that will result, if the offer is accepted, in an adjustment to the amount of bandwidth allocated to the user; and
    if the event is determined to be a security incident, the control system restricting the user's access to the network.

2. The process of claim 1, wherein the adjustment to the amount of bandwidth allocated to the user is performed by at least one of a PCMM, an ERM, and a QPPB.

3. The process of claim 2, wherein the offer to change usage plans is an offer to increase the amount of bandwidth allocated to the user.

4. The process of claim 1, further comprising:
    determining, prior to sending the offer to the user, whether the network has sufficient capacity to support an increase in allocated bandwidth;
    wherein the terms of the offer are based at least in part on the determination of whether the network has sufficient capacity.

5. The process of claim 1, wherein the offer results in a different amount of bandwidth being allocated to the user at non-peak times than at peak times.

6. The process of claim 5, wherein the non-peak times are adjusted periodically for each subset of the network.

7. The process of claim 1, wherein restricting the user's access to the network comprises blocking outbound SMTP messages from the user but allowing other types of messages to be transmitted.

8. The process of claim 1, wherein restricting the user's access to the network comprises rate-limiting messages from the user but still allowing at least some of the messages to be transmitted.

9. The process of claim 1, wherein restricting the user's access to the network comprises determining whether said user is infected with malware and, if so, blocking the user's malware-related messages on the network.

10. The process of claim 1, wherein restricting the user's access to the network comprises redirecting the traffic of the user to a security appliance that filters malicious messages but allows other messages to pass.

11. The process of claim 1, further comprising sending a notification that a computer is infected to the user upon the event being categorized as a security incident.

12. The process of claim 1, wherein monitoring data about the user's usage of the network comprises analyzing data from one or more of IPDR collectors, SNMP pollers, security appliances that filter malicious messages but allow other messages to pass, Syslog servers, and RADIUS and DIAMETER accounting systems.

13. A system comprising:
    a monitor component of a network, the monitor component comprising a first processor and a first memory containing instructions that, when executed, cause the monitor component to monitor a user's network usage to determine if the user's network usage has exceeded a level indicative of an event; and
    a controller component of the network, the controller component comprising a second processor and a second memory containing instructions that, when executed, cause the controller component to determine whether the event is a security incident by comparing the user's network usage to one or more of a usage of other users and a historical usage of the user wherein the controller component is caused to determine whether the user's network usage is consistent with a normal network usage, and wherein an abnormal network usage indicates the event is a security incident;
    the controller component further comprising instructions that, when executed, cause the controller component to:
    if the event is not determined to be a security incident, instruct that the user be sent an offer to change usage plans that will result, if the offer is accepted, in an adjustment to the amount of bandwidth allocated to the user; and if the event is determined to be a security incident, instruct that the user's access to the network be restricted.

14. The system of claim 13, further comprising:

a communication component interconnecting said monitor component and the controller component, the communication component comprising a third processor and a third memory containing instructions that, when executed, cause the communication component to react to instructions from the controller component by signaling at least one of a network configuration system, an administrative system, and a security management system, to effect at least one of sending the user an offer to change usage plans that will result, if the offer is accepted, in an adjustment to the amount of bandwidth allocated to the user and restricting the user's access to the network.

15. The system of claim 14, further comprising said network configuration system connected to said communication component, the network configuration system comprising a fourth processor and a fourth memory containing instructions that, when executed, cause the network communication system to modify said network to increase or decrease the amount of bandwidth allocated to the user in response to a signal from said communication component;

said administrative system connected to said communication component, the administrative system comprising a fifth processor and a fifth memory containing instructions that, when executed, cause the administrative system to send the user, in response to a signal from the communication component, an offer to change usage plans that will result, if the offer is accepted, in an adjustment to the amount of bandwidth allocated to the user;

said security management system connected to said communication component, the security management system comprising a sixth processor and a sixth memory containing instructions that, when executed, cause the security management system to restrict the user's access to the network in response to a signal from the communication component.

16. The system of claim 15, wherein restricting the user's access to the network includes redirecting the user's access to the network includes redirecting the traffic of the user to a security appliance that filters malicious messages but allows other messages to pass.

17. The system of claim 15, wherein said monitoring component obtains data from at least one of the following: IPDR collectors, SNMP pollers, security appliances that filter malicious messages but allow other messages to pass, Syslog servers and RADIUS and DIAMETER accounting systems.

18. The control system of claim 14, wherein: said network configuration system comprises a provisioning component configured by processor executable instructions to re-provision network service to a different bandwidth tier or to block outbound SMTP traffic, a PCMM policy server component configured by processor executable instructions to signal an edge router to create a user service flow with reduced bandwidth, and an ERM component configured by processor executable instructions to enable the allocation of additional DOCSIS QAM channels; said administrative system comprises a messaging/presence component configured by processor executable instructions to inform said user of an event, and a billing component configured by processor executable instructions to perform at least one of upgrading said user's account to a higher bandwidth consumption tier, posting charges for exceeding a monthly consumption limit, or suspending or closing said user's account; said security management system comprises a QPPB component configured by processor executable instructions to signal routers about special handling of user traffic.

19. The process of claim 1, further comprising:

determining, prior to sending the offer to the user, whether a current usage plan associated with the user is optimized for the user's network usage;

wherein the offer is only sent to the user if the current usage plan is not optimized.

20. A process comprising:

monitoring data relating to usage of a network by a plurality of users;

determining from the monitored data that the collective network usage of the users has exceeded a level indicative of an event;

analyzing, using the control system, the network usage of each of the plurality of users to determine from the monitored data whether the individual network usage of at least one of the users has exceeded a level indicative of an event;

determining, by the control system, whether the event is a security incident by comparing the individual network usage of the at least one of the users to one or more of a usage of other users and a historical usage of the at least one of the users, wherein determining whether the event is a security incident comprises determining whether the individual network usage of the at least one of the users is consistent with a normal network usage for a single user, and wherein an abnormal network usage indicates the event is a security incident;

if the event is not determined to be a security incident, the control system sending the at least one of the users an offer to change usage plans that will result, if the offer is accepted, in an adjustment to the amount of bandwidth allocated to the at least one of the users; and if the event is determined to be a security incident, the control system restricting access to the network by the at least one of the users.

* * * * *

UNITED STATES PATENT AND TRADEMARK OFFICE
CERTIFICATE OF CORRECTION

| | | |
|---|---|---|
| PATENT NO. | : 8,762,517 B2 | Page 1 of 1 |
| APPLICATION NO. | : 12/346162 | |
| DATED | : June 24, 2014 | |
| INVENTOR(S) | : Richard M. Woundy et al. | |

It is certified that error appears in the above-identified patent and that said Letters Patent is hereby corrected as shown below:

IN THE SPECIFICATION

In column 5, line 59, replace "know" with -- known --

In column 7, line 3, replace "Teleconmmunication" with -- Telecommunication --

In column 10, line 67, replace "travels" with -- travelers --

IN THE CLAIMS

In column 15, line 20, replace "comprising" with -- comprising: --

Signed and Sealed this
Thirtieth Day of June, 2015

Michelle K. Lee
*Director of the United States Patent and Trademark Office*